United States Patent
Akimov et al.

(10) Patent No.: US 8,665,108 B2
(45) Date of Patent: Mar. 4, 2014

(54) APPARATUS AND METHOD FOR QUALITY ASSESSMENT OF DOWNHOLE DATA

(75) Inventors: Oleg N. Akimov, Niedersachsen (DE); Ansgar Baule, Lower Saxony (DE); Christian Fulda, Lower Saxony (DE); Andreas Hartmann, Niedersachsen (DE)

(73) Assignee: Baker Hughes Incorporated, Houston, TX (US)

( * ) Notice: Subject to any disclaimer, the term of this patent is extended or adjusted under 35 U.S.C. 154(b) by 231 days.

(21) Appl. No.: 12/840,400

(22) Filed: Jul. 21, 2010

(65) Prior Publication Data

US 2011/0025525 A1    Feb. 3, 2011

Related U.S. Application Data (60) Provisional application No. 61/230,907, filed on Aug. 3, 2009.

(51) Int. Cl.
| | |
|---|---|
| *G01V 3/00* | (2006.01) |
| *E21B 45/00* | (2006.01) |
| *E21B 47/12* | (2012.01) |
| *E21B 47/00* | (2012.01) |

(52) U.S. Cl.
CPC *E21B 47/12* (2013.01); *E21B 47/00* (2013.01)
USPC ............................. 340/853.2; 73/152.45

(58) Field of Classification Search
USPC ................ 340/853.1–856.4; 367/81–87; 702/81–84, 109–112, 124–126, 103, 702/106; 370/248, 252; 375/224
See application file for complete search history.

(56) References Cited

U.S. PATENT DOCUMENTS

| | | | |
|---|---|---|---|
| 5,887,031 A * | 3/1999 | Parr et al. ................... 375/227 |
| 2007/0112521 A1 | 5/2007 | Akimov et al. |
| 2007/0208546 A1 | 9/2007 | Fang et al. |
| 2007/0257809 A1 * | 11/2007 | Camwell et al. ........... 340/853.7 |
| 2009/0177404 A1 | 7/2009 | Hartmann et al. |

* cited by examiner

*Primary Examiner* — Mohammad Ghayour
*Assistant Examiner* — Jerold Murphy
(74) *Attorney, Agent, or Firm* — Cantor Colburn LLP (57) ABSTRACT

In one aspect, a method for assessing quality of a downhole data is provided. The method, according to one embodiment, may include defining a quality criterion based on one or more parameters of interest, determining a quality assessment value for a first data, determining a quality assessment value for each run of a plurality of runs using the quality criterion, determining a quality factor from the computed quality assessment values of the plurality of runs, and determining a quality level of the first data using the quality assessment value of the first data and the quality factor of the computed quality assessment values.

20 Claims, 5 Drawing Sheets

APPARATUS AND METHOD FOR QUALITY ASSESSMENT OF DOWNHOLE DATA

CROSS REFERENCES TO RELATED APPLICATIONS

This application claims priority to provisional application 61/230,907 filed Aug. 3, 2009.

FIELD OF THE DISCLOSURE

The disclosure herein relates generally to apparatus and methods for estimating quality of downhole data.

BACKGROUND OF THE RELATED ART

Oil wells (also referred to herein as "wellbores" or "boreholes") are drilled to recover hydrocarbons (oil and gas) from subsurface formations. A drill string containing a drilling tubular carrying a drilling assembly (also referred to as the "bottomhole assembly" or "BHA") is used for drilling the wellbore. BHA typically includes a large number of sensors that measure a variety of parameters relating to the formation or the drilling environment. Such sensors typically include resistivity sensors, gamma ray sensors, nuclear sensors, acoustic sensors, nuclear magnetic resonance sensors, formation testing sensors, sensors for estimating inclination, azimuth, etc. The BHA also includes one or more processors to process the downhole measurements and transmit in real-time selected information relating to the formation and other parameters to the surface via a telemetry unit. The telemetry method most often used is mud pulse telemetry, wherein signals are transmitted through the drilling fluid (or mud) circulating through the drill string. Such telemetry methods are capable of transmitting only a few pulses per minute. Therefore, a large amount of downhole data is often stored in one or more data storage devices (such as a solid state memory device) and only certain results obtained from such data are transmitted in real-time to the surface. The data stored in the downhole memory device ("memory data") is retrieved when the drill string is tripped out of the wellbore and processed to estimate the various properties of interest and to generate images of one or more parameters. The quality level of downhole data or the images obtained from such data is evaluated after drilling is completed. The quality assessment of such data or images is usually subjective. It is therefore desirable to provide apparatus and methods for objectively assessing the quality level of real-time data and data retrieved from the memory.

SUMMARY OF THE DISCLOSURE

In one aspect, a method for assessing quality of downhole data is provided. The method, according to one embodiment, may include: defining one or more quality parameters or quality indicators; defining a quality criterion based on the one or more quality parameters; determining a quality assessment value for a first data corresponding to the quality criterion; obtaining a second dataset from a plurality of wellbores ("runs"); determining a quality assessment value for each run corresponding to the quality criterion; determining a quality factor from the computed quality assessment values of the plurality of runs; and determining a quality level of the first data using the quality assessment value for the first data and the quality factor of the computed quality assessment values.

In another aspect, a computer-readable medium accessible to a processor is provided. The computer-readable medium, in one aspect, may have embedded therein a computer program that includes instructions to: access downhole data corresponding to a plurality of wellbores ("runs") defining a base data; access a quality criterion based on one or more quality parameters; compute a quality assessment value for each of the runs corresponding to the quality criterion; determine a quality factor from the computed quality assessment values for the plurality of runs; access a result data; determine a quality assessment value of the result data corresponding to the quality criterion; and determine a quality level of the result data using the quality assessment value of the result data and the quality factor.

Examples of certain features of apparatus and method for assessing quality of data have been summarized rather broadly in order that the detailed description thereof that follows may be better understood. There are, of course, additional features of the apparatus and method disclosed hereinafter that will form the subject of the claims made pursuant to this disclosure.

BRIEF DESCRIPTION OF THE DRAWINGS

The illustrative embodiments and their advantages will be better understood by referring to the following detailed description and the attached drawings, in which.

DESCRIPTION OF ILLUSTRATIVE EMBODIMENTS

A large number of sensors are utilized for estimating a variety of formation and other parameters during drilling of a wellbore. Such sensors, generally referred to herein as the measurement-while-drilling ("MWD") sensors or "logging-while-drilling ("LWD") sensors, typically form a part of a drilling assembly (also referred to as a bottomhole assembly or "BHA") and are used to obtain a variety of downhole measurements during drilling of wellbores. The downhole measurements made by such sensors are processed by a processor in the BHA for use in estimating one or more properties of the formation and wellbore. Such sensors typically include: resistivity sensors, nuclear sensors, acoustic sensors, nuclear magnetic resonance sensors, formation testing sensors, etc. Some of the processed data (referred to herein as the real-time data) is transmitted from the BHA to the surface during drilling of the wellbore. A large amount of the processed data is stored in a data storage device, such as a memory device. The data from the memory device is retrieved and processed after the BHA has been retrieved from the wellbore. The data from different wellbores or runs is often stored in the form of logs or images.

The disclosure herein, in general, provides apparatus and methods for assessing the quality of a real-time data, a run data or data from a number of runs relative to another data, which may be data from a particular run or from a number of other runs. In one aspect, the disclosure provides apparatus and methods for assessing quality of a first data (also referred to as the "result data") relative to the quality of a second data (also referred to as the "base data") using a selected quality criterion. In one aspect, to determine the quality level of a particular result data, one or more quality parameters or quality indicators may be specified. A quality assessment value of each data set in the base data (i.e. dataset corresponding to each run data) is calculated using the selected quality criterion. A quality factor for the entire base data, which may be a statistical measure obtained from the various quality assessment values, is calculated. A quality assessment value of the result data is calculated using the selected quality criterion. The quality level of the result data relative to the quality factor for the base dataset may then be determined using the quality assessment value of the result data and the quality factor of the base data. A detailed exemplary process for determining the quality level of a result data is described in reference to FIGS. 1-4.

Figure 1:
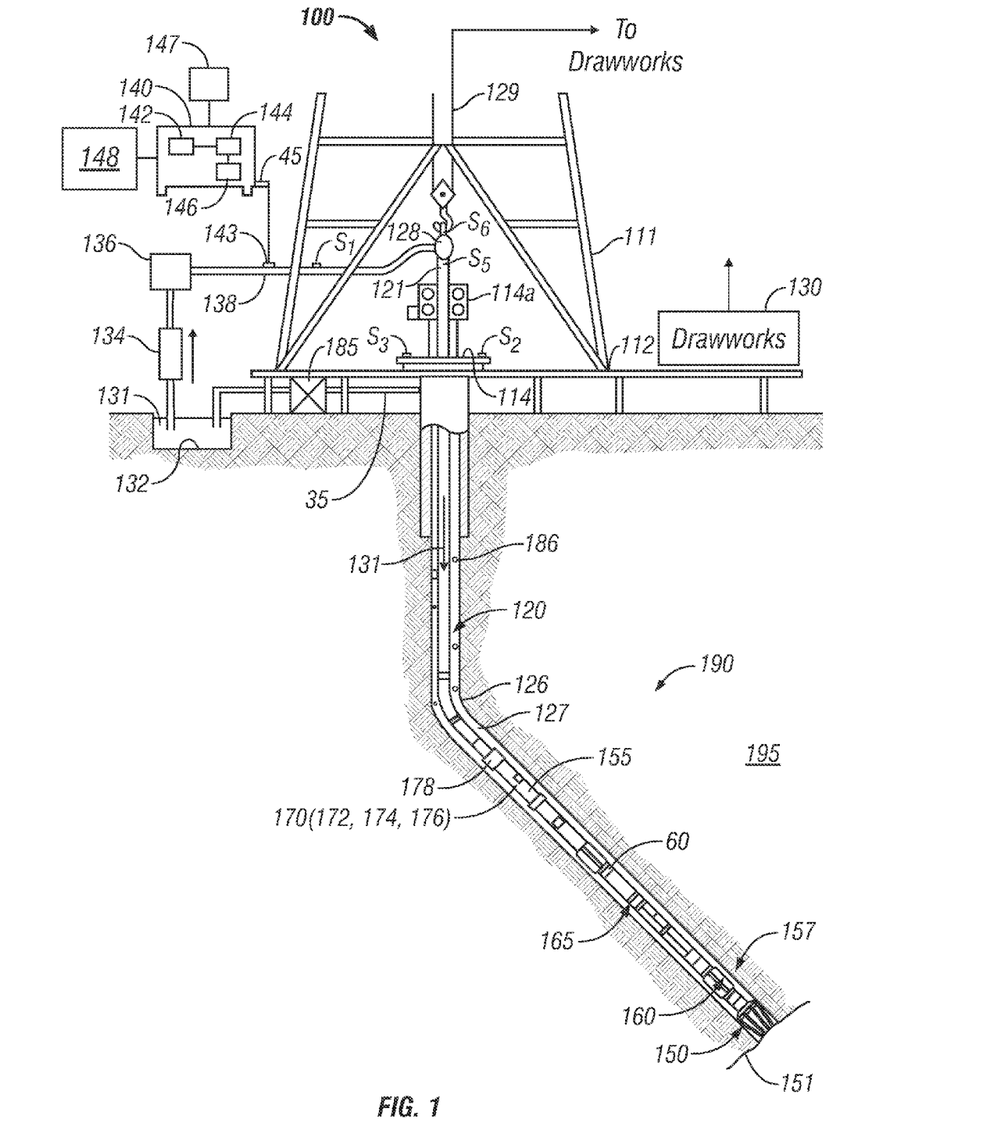
FIG. 1 shows a schematic diagram of a drilling system that may be utilized to obtain downhole data for a set of runs and/or for performing a quality assessment on real-time data during drilling of a wellbore, according to one embodiment of the disclosure.

FIG. 1 is a schematic diagram of an exemplary drilling system 100 that may be utilized for obtaining run data for wellbores, for providing real-time data during drilling of a wellbore and/or for processing data for determining a quality level of the real-time data, according to one aspect of the disclosure. FIG. 1 shows a drill string 120 that includes a drilling assembly or bottomhole assembly (BHA) 190 conveyed in a wellbore 126. The drilling system 100 includes a derrick 111 erected on a platform or floor 112 which supports a rotary table 114 that may be rotated by a prime mover, such as an electric motor (not shown), at a desired rotational speed. A tubing 122 (such as a jointed drill pipe), having the drilling assembly 190 attached at its bottom end, extends from the surface to the bottom 151 of the borehole 126. A drill bit 150 attached to the drilling assembly 190 disintegrates the geological formations when it is rotated to drill the wellbore 126. The drill string 120 is coupled to a drawworks 130 via a Kelly joint 121, swivel 128 and line 129 through a pulley. Drawworks 130 is operated to control the weight-on-bit ("WOB"). The drill string 120 may be rotated by a top drive (not shown) instead of by rotating the rotary table 114. Alternatively, a coiled-tubing may be used as the tubing 122. A tubing injector 114a may be used to convey the coiled-tubing and the BHA into the wellbore 126. In some applications, the drill bit 150 is rotated by only rotating the tubing 122. However, in other applications a downhole motor 155 (mud motor) disposed in the drilling assembly 190 may be used to rotate the drill bit 150.

A suitable drilling fluid 131 (also referred to as "mud") from a source 132 thereof, such as a mud pit, is circulated under pressure through the drill string 120 by a mud pump 134. The drilling fluid 131 passes from the mud pump 134 into the drill string 120 via a desurger 136 and a fluid line 138. The drilling fluid 131 discharges at the wellbore bottom 151 through openings in the drill bit 150. The drilling fluid 131 carrying drill cuttings 186 returns to the mud pit 132 via the annular space 127 (between the drill string 120 and the wellbore 126), return line 135 and drill cutting screen 185. The drill cutting screen 185 removes the drill cuttings 186 from the returning drilling fluid. A sensor $S_1$ in line 138 provides information about the fluid flow rate. A surface torque sensor $S_2$ and a sensor $S_3$ associated with the drill string 120 respectively provide information about the torque and the rotational speed of the drill string 120. Tubing injection speed is determined from sensor $S_5$, while sensor $S_6$ provides the hook load of the drill string 120.

A surface control unit or controller 140 receives signals from the downhole sensors and devices (described later) via a sensor 143 placed in the fluid line 138 and signals from sensors $S_1$-$S_6$ and other sensors used in the system 100 and processes such signals according to programmed instructions provided to the surface control unit 140. The surface control unit 140 displays desired drilling parameters and other information on a display/monitor 148 that is utilized by an operator to control the drilling operations. The surface control unit 140 may be a computer-based unit that, in one aspect, may include a processor 142 (such as a microprocessor), a storage device 144 (such as a solid-state memory, tape or hard disk), and one or more computer programs 146 accessible to the processor 142 for executing instructions contained in such programs. The surface control unit 140 may further communicate with a remote control unit 147. The surface control unit 140, in one aspect, may process downhole and surface obtained data to determine quality level of a real-time data, provide images, control one or more sensors in the BHA and control one or more drilling operations.

The BHA 190, in aspects, may include a variety of formation evaluation sensors or devices (also referred to as measurement-while-drilling (MWD) sensors or logging-while-drilling (LWD) sensors) for determining various properties of the formation, including, but not limited to, resistivity, density, porosity, permeability, acoustic properties, nuclear-magnetic resonance properties, rock properties, properties of fluids downhole and other desired properties of the formation 195 surrounding the BHA assembly 190. Such sensors typically may include, but are not limited to, resistivity sensors, nuclear sensors, acoustic sensors, nuclear magnetic sensors and formation evaluation sensors. For convenience, such sensors are collectively designated by numeral 165. The BHA 190 may further include a variety of other sensors and devices (collectively designated herein by numeral 160) for determining one or more properties of the BHA 190, (including, but not limited to, bending moment, acceleration, oscillations, whirl, stick-slip, etc.) and drilling operating parameters, such as weight-on-bit, fluid flow rate, pressure, temperature, rate of penetration, azimuth, tool face, and drill bit rotation.

The BHA 190 also includes a power generation unit 178 that supplies electrical power to the sensors 160 and 165 and other electrical circuits and devices in the BHA 190. A telemetry unit 180 in the drill string 120 establishes a two-way data communication between the BHA 190 and the surface controller 140. The power generator unit 178 may be any suitable device, including, but not limited to, a turbine operated by the drilling fluid 131 flowing through the BHA 190 that drives an alternator (not shown). The telemetry unit 180 may be any suitable unit, including a mud-pulse telemetry unit, an electromagnetic wave propagation unit, an acoustic telemetry unit, and a wired-pipe telemetry system. The drilling assembly 190 further includes a downhole controller 170, which may further include a processor 172, such a microprocessor, a data storage device (or a computer-readable medium) 174, data and algorithms and computer programs 176. The data storage device 174 may be any suitable device, including, but not limited to, a read-only memory (ROM), random-access memory (RAM), flash memory and hard disk.

During drilling operations, the controller 170 receives data from the sensors 160 and 165, processes such data, transmits some of the data in real-time (real-time data) to the surface via the telemetry unit 180 and stores other data in the downhole storage device 174 (memory data). In one aspect, the downhole controller 170 may determine the quality level of the real-time data and provide such information to the surface controller 140. In another aspect, the downhole controller 170 may determine a quality level of the real-time data or the memory data as described in more detail in reference to FIGS. 2-4. In another aspect, the memory data may be retrieved when the BHA 190 is pulled out of the wellbore 126. Run data from various runs may be stored at the surface and utilized by a computer system to determine the quality level of one or more run data relative to data from various runs, as described in more detail in reference to FIGS. 2-4.

Figure 2:
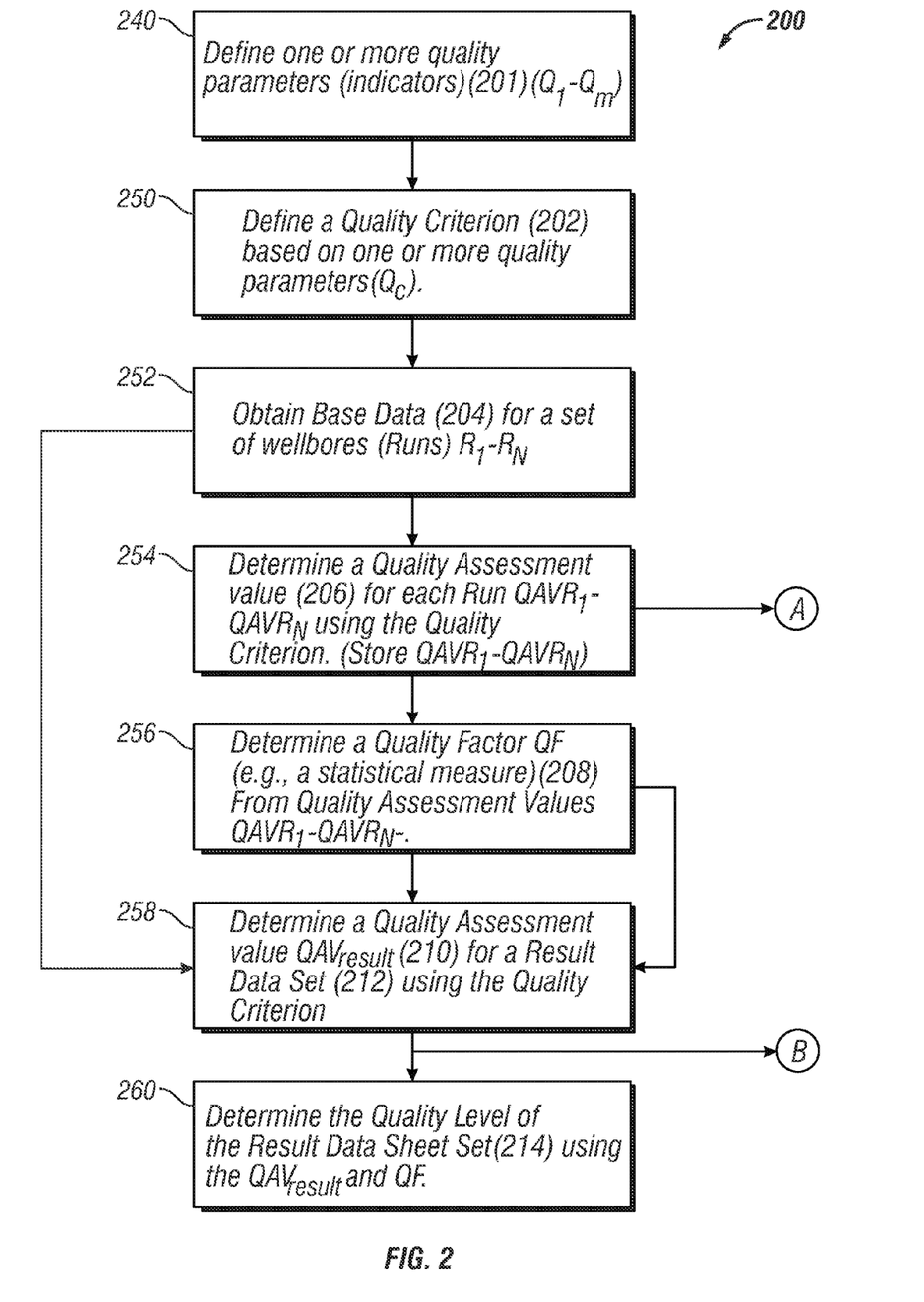
FIG. 2 is flow chart illustrating an exemplary method for determining a quality level of a first downhole dataset relative to a quality level of data from a number of wells or runs or a subset thereof corresponding to selected quality criterion.

FIG. 2 is a flowchart illustrating an exemplary method 200 that may be utilized for determining a quality level (or a quality assessment) of a particular run data or memory data utilizing relative to a base data constituting data from a number of runs corresponding to a selected quality criterion. In one aspect, one or more quality parameters (also referred to herein as "quality indicators") Q1-Qm (201) are defined for use in the method 200 (BOX 240). A quality criterion (202) is then selected using one or more quality parameters Q1-Qm (BOX 250). Examples of quality parameters and quality criteria may include, but are not limited to: (a) "spikes"—a sudden change of a color of a single pixel in the image to a maximum/minimum value may be a quality parameter and the density of the spikes per a defined depth (e.g. a wellbore length or an azimuthal wellbore depth of investigation) may be the quality criterion; (b) "stripes" on the image—darkening of colors visible on the low side of the wellbore may be the quality parameter and the fraction of the borehole affected by stripes may be used as the quality criterion; (c) a sudden change in the color of all sectors of the image may be the quality parameter and the number of the sudden changes per a selected wellbore depth may be used as a quality criterion; (d) "gap identification"—gaps in a data set, which occur in real-time due to communications problems, or in memory data due to problems related toe the downhole tool taking the measurements and problems with the time-depth assignment, may be a quality parameter and a measure of the gaps (such as the number of the gaps or percent of data in the gaps, etc.) per a selected depth interval may be used as a quality criterion; (e) "truncations" sometimes caused by time-depth problems may be a quality parameter and the density of the truncations may be used as a quality criterion; and (f) a qualitative parameter, such as comments of knowledgeable persons (clients, rig operators, etc.) or a subjective scale of grades. In other aspects, the quality criterion 202 may be based on or derived from more that one quality parameter. The use of such quality parameters results in a defined set of quantitative indicators, each such indicator yielding a single value per analyzed data set or a statistical value (such as a mean value plus a standard deviation). Also, a ranking algorithm may be defined based on such quantitative indicators for use in determining the quality level of the result data.

A base data set 204 is then selected corresponding to a number of runs $R_1$-$R_N$ (Block 252). A quality assessment value QAV (206) for each run ($R_1$-$R_N$) in the base data is then calculated (Block 254) corresponding to the selected quality criterion. For example, if the quality parameter or indicator is gaps and the quality criterion is the number of gaps per unit depth, then for each run the QAV will be the number of gaps per unit depth. Such quality assessment values are denoted by $QAVR_1$-$QAVR_N$ for the runs $R_1$-$R_N$ respectively, which values may be stored in a data storage device. Using the quality assessment values $QAVR_1$-$QAVR_N$, a quality factor QF (208) is calculated for the base data 204 (Block 256). The quality factor QF may comprise of one or more numbers that might be selected from statistical measures of the data set, such as a mean value, a median value, a standard deviation, a weighted average, or another suitable value of $QAVR_1$-$QAVR_N$. In one aspect, the quality factor QF represents a base line quality level for the runs in the base data. A quality assessment value (210) is calculated for the result data (212) corresponding to the quality criterion 202, which quality assessment value is designated by $QAV_{result}$. The quality Level (QL) (214) for the result data (212) relative to the quality factor may then be calculated using the quality factor QF and the quality assessment value $QAV_{result}$. The quality level QL of the result data may be represented by any suitable value, such as a ranking relative to the quality factor QF of the base data, a percentile in which the quality level of the result data falls relative to the quality factor QF, etc.

In some cases, it may be desirable to utilize a subset of the quality assessment values $QAVR_1$-$QAVR_N$ of the base data to determine the quality level of a result data. For example, if the base data corresponds to runs from a hemisphere and it may be desirable to use QAVs for runs from a particular geographic area within the hemisphere or the runs made during a time period, such as one year of data acquisition, to determine the quality level of the particular result data. In such a case, quality assessment values corresponding to a subset of the values in the set $QAVR_1$-$QAVR_N$ may be selected (Block 270). The values in the subset are designated by QAVs. A quality factor $QF_S$ from the quality assessment values of the subset QAVs may then be computed. The quality level QL for the result data may then be computed using the quality assessment $QAV_{result}$ (210) of the result data and the QFs of the subset (Block 272).

In one aspect, the quality assessment values of a particular run data corresponding to the various quality parameters Q1-Qm results in a set of quantitative quality indicators, each indicator corresponding to a single value. A mean value plus a standard deviation for a quality indicator may be computed from a number of runs. Such qualitative values may be stored in a globally-accessible data base and utilized in a ranking or comparing the quality levels of individual runs, groups of runs (referred to herein as comparison groups or "CGs") The CGs may be groups of data having similar parameters so that their quality levels may be compared and/or ranked. Any of the parameters described above or other useful parameters may be utilized for comparison and ranking of CG's. In one aspect, a statistic value for each such parameter (e.g., a mean value and standard deviation) may be calculated. The data in a particular CG may be ranked with respect to a group mean value for each considered parameter. For example a cumulative gap parameter for a particular data set may be ranked as worse than 90% of the data sets in the CG. The images in the same CG may be further grouped, for instance on geographic region bases. Such a grouping may aid in assessing the performance of region, such as that a region X has higher real-time image quality compared to region Y. This reason for the difference in the quality between regions X and Y may be an identifiable reason, such as the communication devices used for obtaining data in region X had a higher telemetry rate compared to the communication devices used in the region Y. As noted above, the usage of the data in a CG may be limited by time, such as data not older than two years, to ensure that recent or up-to-date data is used for ranking. Additionally, the statistical quality level of a CG may be tracked over a longer periods of time to identify trends of service quality. In another aspect, the collected data may be used to track the quality and reliability of a particular service. The quality assessment data collected herein may be utilized to set baselines for the quality of certain tools and services, demonstrate the service quality of certain tools and services, modify certain tools and/or develop new tools and technologies.

Figure 3:
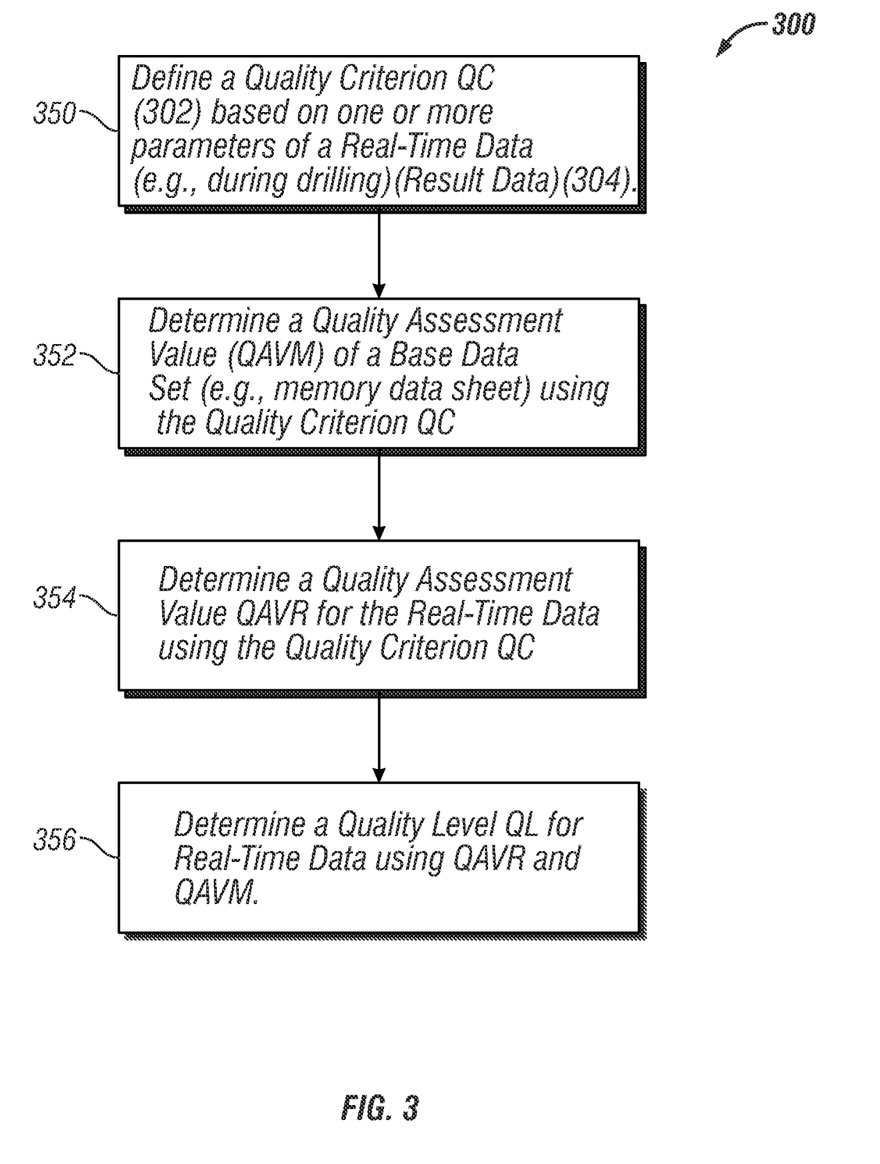
FIG. 3 is a flow chart illustrating an exemplary method for determining a quality level of a real-time downhole dataset relative to a memory data corresponding to a selected quality criterion.

FIG. 3 is a flowchart illustrating an exemplary method 300 for performing a quality assessment of real-time data using data in a memory as the base data. In the case of real-time data, quality parameters or indictors other than the above-noted quality parameters may also be used. For example, peak signal to noise ratio (PSNR) value may be used as a quality parameter. The PSNR value for a real-time data set may be calculated under the assumption that the memory data set corresponds to the base data and the real-time data set corresponds to the result data. Another example may be the gaps that occur in the real-time data due to problems associated with the communication channel (such as mud pulse telemetry channel) used in the drilling system 100 for acquiring the data from the wellbore. The maximum value of such gaps and the sum value of such gaps may be used as the quality indicator. Additional characteristics of a real-time data set, such as energy, entropy, frequency content, and contrast may also be used as the quality indicators by relating them the corresponding characteristic of the memory data set. For example the ratio of energy of real-time data to the energy of memory data might measure the quality of the real-time data. In one aspect, values of such characteristics may be calculated for a real-time data and a memory data and compared to determine the quality level of the real-time data. Pixel size of a real-time image may be another quality indicator. Image resolution may also influence the quantitative quality assessment. It may be useful to use different quantitative values for the quality assessment for different image formats. Truncations caused by time-depth problems may also be used as a parameter and the density thereof may be used to define the quality criterion.

Still referring to FIG. 3, to determine a quality level QL for a real-time data, the process may include: defining a quality criterion QC 302 for the real-time-data 304 (Block 350); determining a quality assessment value QAVM for a base data, such as a memory data (Block 352); determining a quality assessment value QAVR for the real-time data during drilling of a wellbore (Block 354); and determining the quality level QL for the real-time data 304 using the quality assessment value QAVM for the memory data and the quality assessment value QAVR for the real-time data 304. The quality assessment methods of the disclosure herein may be implemented in a computer-based system or a processor-based system, disposed at a surface location or in a BHA.

Figure 4:
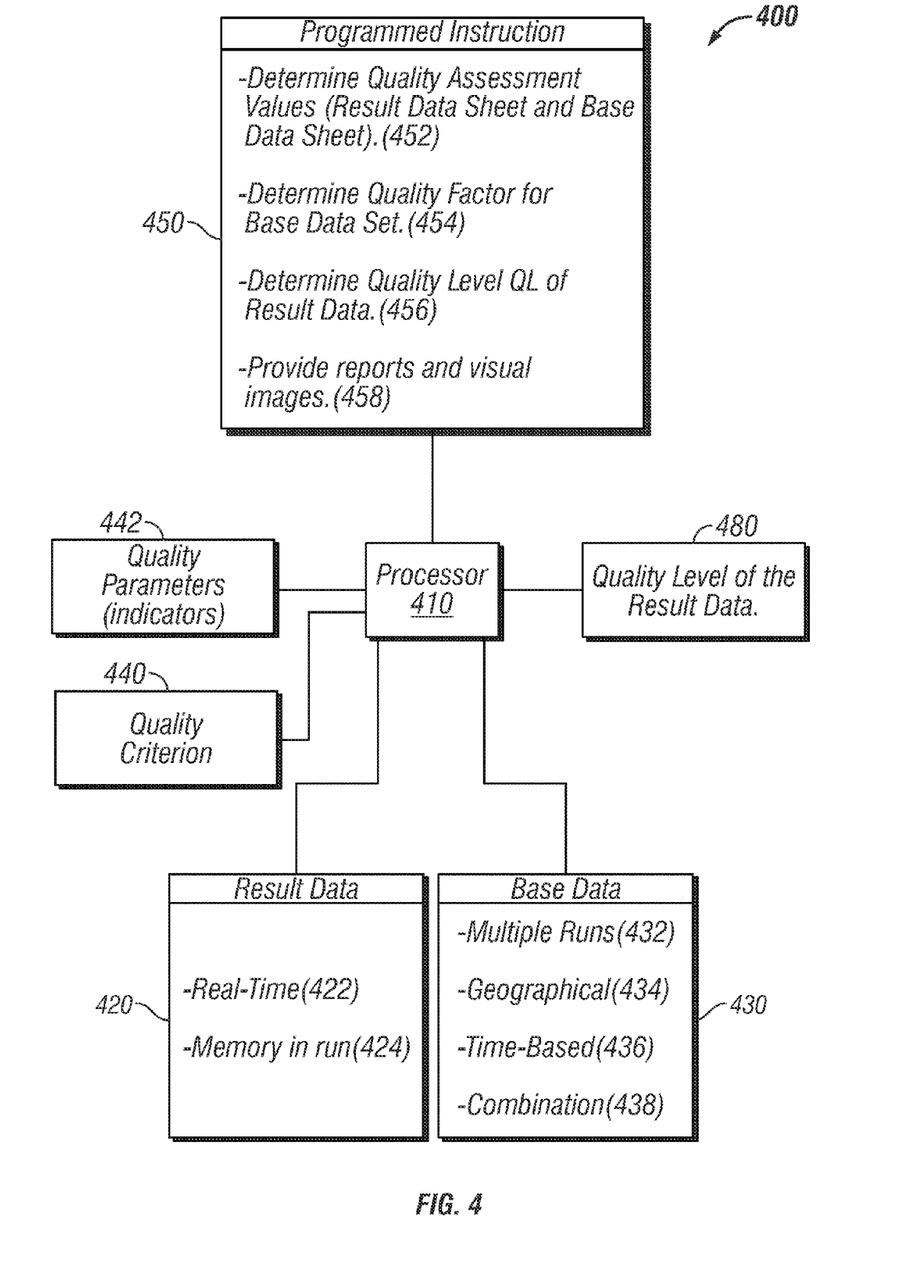
FIG. 4 is a functional block diagram illustrating an exemplary processor configured to implement the methods described in this disclosure.

FIG. 4 is a functional block diagram illustrating an exemplary computer system 400 configured to implement the methods described herein, according to one embodiment. The system 400 is shown to include a processor 410, which may be a microprocessor used for performing computation and processing data. The processor 410 may be a part of a computer system at the surface or a part of a circuit in a downhole tool. Result data 420, which may include a real-time data 422, a memory or a run data 424, is accessible to the processor 410. Also, the base data 430, which may include data 432 from a particular run, data 434 from runs in a geographical area and/or time-based data 436 or a combination data 438, is accessible to the processor 410. The result data 420 and the base data 430 may be stored in one or more computer-readable media accessible to the processor 410. The computer-readable medium may be any data storage device, including, but not limited to, a random-access memory, a read-only memory, a flash memory and a disk. A quality criterion 440 based on one or more parameters of interest 442 is made accessible to the processor 410 for use in performing the methods disclosed herein. A computer program 450 containing the instructions for performing the methods disclosed herein is accessible to the processor 410 via a suitable computer-readable medium. The programmed instructions may include, among other things, instructions to access the result data and the base data; determine the quality assessment values relating to the result data and the base data (452); determine a quality factor for the base data and use the quality factor for the base data and the quality assessment value of the result data (454); and determine a quality level QL of the result data (456); and provide the various calculation and results so obtained in the form of on-screen and hard copy reports (458).

Thus, in one aspect, the disclosure provides a method of determining a relative quality level of a downhole data (a first data set or a result data) that may comprise: defining a quality criterion (QC) based on one or more quality parameters (or quality indicators); determining a quality assessment value (QAV) for the first data corresponding to the quality criterion; determining a QAV for a second data set (base data) comprising one or more data sets corresponding to the quality criterion; determining a quality factor QF from the determined quality assessment values of the second data set; and determining the relative quality level of the first data set using the QAV of the first data and the quality factor QF of the second data. In one aspect, determining the quality factor may include using a subset of the quality assessment values of a plurality of run data sets. In another aspect, the quality factor may be a statistical measure.

The second data set may include data sets selected according to one or more specific criteria. These may include, but are not limited to: data from a single run, data from a specified time period within a run; a selected geographical region; a combination of two or more geographical regions; runs made over a selected time period; data sets using at least one common downhole tool; runs for the same customer; and any combination of the above.

In yet another aspect, a method for determining a relative quality of a real-time downhole data set is provided, which method may include: defining a quality criterion based on at least one quality parameter; obtaining a first downhole data set in real-time during drilling of a wellbore; obtaining a second downhole data set; determining a quality assessment value for the first downhole data set corresponding to the quality criterion; determining a quality assessment value for the second data set corresponding to the quality criterion; and determining the relative quality level of the first downhole data set using the quality assessment value of the first downhole data set and the quality assessment value of the second data set during drilling of the wellbore. In one aspect, second data set may include one of: data stored in a memory of the tool during drilling of the wellbore; and data stored at a surface location. In another aspect, the first data set may be a subset of the second data set. In another aspect, the method may further include determining the quality level of the first data set before transmitting the first data set to a surface location during drilling of the wellbore.

The quality parameters used in defining the quality criterion may include one or more parameters that can provide a quantitative measure of a quality level of a downhole data. The quality parameters may include, but are not limited to: peak signal to noise ratio (PSNR); number of anomalous data; gaps; energy; entropy; contrast; data density; data of a feature; artifacts in data; a sudden change in measurement values; a data artifact caused by a problem with the time-depth tracking; pixel size; density of a feature per depth interval; stripes on an image; a sudden change in a color; truncation, such as caused by a time-depth event; and a subjective criterion.

In another aspect, a computer-readable medium accessible to processor is provided, wherein the computer-readable medium has a program embedded therein, which program may include instructions to be executed by the processor, which instructions may further include instructions to: access a downhole base data comprising data corresponding to one or more wellbores ("runs"); access a quality criterion based on one or more parameters of interest; compute a quality assessment value QAV for each of the wellbores using the quality criterion; instructions to determine a statistical quality assessment value SQAV from the computed quality assessment values of the wellbores; determine a quality assessment value QAV of a result data using the quality criterion; and determining a quality level of the result data using the QAV of the result data and SQAV of the base data. In aspects, the parameter of interest may include at least one parameter that provides a quantitative measure of a quality level of a downhole data. Further, the parameter of interest may be selected from the group consisting of: peak signal to noise ratio (PSNR); number of anomalous data; gaps; energy; entropy; contrast; data density; data of a feature; artifacts in data; a sudden change in measurement values; a data artifact caused by a problem with the time-depth tracking; pixel size; density of a feature per depth interval; stripes on an image; a sudden change in a color; truncation caused by a time-depth event; and a subjective criterion.

In yet another aspect, an apparatus for determining a quality level of a downhole data is provided, which apparatus, in one embodiment, may include; a processor, a data storage device containing therein a first data and a second data set, a computer program executable by the processor, wherein the computer program may include instructions to access the first data; determine a quality assessment value of the first data using a defined quality criterion; determine a quality assessment value of the second data using the quality criterion, and determining the quality level of the first data relative to the second data using the quality assessment values of the first data and the second data.

In one aspect, the instruction to determine a quality level of the first data set relative to the second data set may include instructions to determine a quality factor from the determined quality assessment value of the second data set. In addition, the quality factor may be statistical measure. In another aspect, the instruction to determine a quality level of the first data set relative to the second data set comprises instructions to determine a quality factor from a subset of determined quality assessment values of a plurality of run data set. In aspects, the second data set comprises data sets selected according to one or more specific criteria. In one aspect, the specific criteria is selected from the group consisting of: data from a single run; data from a specified time period within a run; a selected geographical region; a combination of two or more geographical regions; runs made over a selected time period; data sets using at least one common downhole tool; and runs for the same customer.

The disclosure herein describes particular embodiments of a quality assessment apparatus and methods. Such embodiments are not to be construed as limitations to the concepts described herein. Various modifications to the apparatus ad methods described herein will be apparent to persons of ordinary skill in the art. All such modifications are considered a part of the disclosure herein.

The invention claimed is:

1. A method of determining a relative quality level of downhole data relating to a downhole parameter of a formation, the method comprising:

defining a quality criterion (QC) based on at least one quality parameter;

obtaining a first data set from measurements made of a the downhole parameter by a first downhole tool during drilling through the formation;

determining a quality assessment value (QAV) for the first data set corresponding to the quality criterion;

obtaining a second data set from measurements made of the downhole parameter that includes measurements different from the measurements relating to the first data set obtained by at least a second downhole tool;

determining a QAV for the second data set comprising at least one data set corresponding to the quality criterion;

determining a quality factor (QF) from the determined QAV of the second data set; and determining the relative quality level of the first data set using the QAV of the first data set and the QF from the second data set.

2. The method of claim 1, wherein the second data set includes data from a plurality of runs and wherein determining the QF comprises using a subset of QAVs of the plurality of runs.

3. The method of claim 1, wherein the QF is a statistical measure.

4. The method of claim 1, wherein the quality parameter is selected from the group consisting of: peak signal to noise ratio (PSNR); gaps; energy; entropy; contrast; data density; data of a feature; artifacts in data; a sudden change in measurement values; density of a feature per depth interval; stripes on an image; a sudden change in a color; and truncation caused by a time-depth event.

5. The method of claim 1, wherein the second data set is selected from the group consisting of: data from a single run; data from a specified time period within a run; a selected geographical region; a combination of two or more geographical regions; runs made over a selected time period; data sets using at least one common downhole tool; runs for a particular customer; and a combination thereof.

6. A method for determining a relative quality of a real-time downhole data set, wherein the method comprises:

defining a quality criterion based on at least one quality parameter;

obtaining a first downhole data set in real-time relating to a downhole parameter using a first downhole tool during drilling of a wellbore;

obtaining a second downhole data set relating to the downhole parameter that includes data different from the first data set using a second downhole tool;

determining a quality assessment value for the first downhole data set corresponding to the quality criterion;

determining a quality assessment value for the second data set corresponding to the quality criterion;

determining a quality factor of the second data set from the determined quality assessment value of the second data set; and determining the relative quality level of the first downhole data set using the quality assessment value of the first downhole data set and the quality factor of the second data set during drilling of the wellbore.

7. The method of claim 6, wherein the second downhole data set comprises data selected from a group consisting of: data stored in a memory of the tool during drilling of the wellbore; and data stored at a surface location.

8. The method of claim 6, wherein the first downhole data set is a subset of the second downhole data set.

9. The method of claim 6, wherein determining the relative quality level comprises determining the quality level of the first downhole data set before transmitting the first downhole data set to a surface location during drilling of the wellbore.

10. The method of claim 6, wherein at least one quality parameter used in defining the quality criterion comprises at least one parameter that provides a quantitative measure of a quality level of a downhole data.

11. The method of claim 6, wherein the at least one quality parameter is selected from the group consisting of: peak signal to noise ratio (PSNR); number of anomalous data; gaps; energy; entropy; contrast; data density; data of a feature; artifacts in data; a sudden change in measurement values; a data artifact caused by a problem with the time-depth tracking; pixel size; density of a feature per depth interval; stripes on an image; a sudden change in a color; truncation caused by a time-depth event; and a subjective criterion.

12. A non-transitory computer-readable medium accessible to a processor, wherein the computer-readable medium has a program embedded therein, which program comprises instructions to be executed by the processor, which instructions comprise instructions to:
  access a database of downhole base data obtained from a first downhole tool corresponding to one or more wellbores;
  access a quality criterion based on one or more parameters of interest;
  compute a quality assessment value (QAV) for each wellbore using the quality criterion;
  determine a statistical quality assessment value (SQAV) from the computed QAVs of the wellbores;
  access a database of result data obtained in real-time from a second downhole tool during drilling of a wellbore;
  determine a QAV of the result data using the quality criterion; and determining a quality level of the result data using the QAV of the result data and SQAV of the base data.

13. The computer-readable medium of claim 12, wherein the parameter of interest comprises at least one parameter that provides a quantitative measure of a quality level of a downhole data.

14. The computer-readable medium of claim 12, wherein the parameter of interest is selected from the group consisting of: peak signal to noise ratio (PSNR); gaps; energy; entropy; contrast; data density; data of a feature; artifacts in data; a sudden change in measurement values; pixel size; density of a feature per depth interval; stripes on an image; a sudden change in a color; and truncation caused by a time-depth event.

15. An apparatus for determining a quality level of a downhole data, the apparatus comprising:
  a processor;
  a data storage device containing therein a first database obtained from measurements of a downhole parameter by a first downhole tool during drilling of a wellbore and a second database that includes data obtained from different measurements of the downhole parameter by a second downhole tool; and
  a computer program executable by the processor, wherein the computer program comprises instructions to:
  access a first data set of the downhole parameter from the first database;
  determine a quality assessment value of the first data set using a defined quality criterion;
  determine a quality assessment value of a second data set of the downhole parameter from the second database using the quality criterion;
  determine a quality factor from the determined quality assessment value of the second data set; and
  determine a quality level of the first data set relative to the second data set using the quality assessment value of the first data set and the quality factor of the second data set.

16. The apparatus of claim 15, wherein the instruction to determine a quality level of the first data set relative to the second data set comprises instructions to determine a quality factor from the determined quality assessment value of the second data set.

17. The apparatus of claim 15, wherein the quality factor is a statistical measure.

18. The apparatus of claim 15, wherein the instruction to determine a quality level of the first data set relative to the second data set comprises instructions to determine a quality factor from a subset of determined quality assessment values of a plurality of run data set.

19. The apparatus of claim 15, wherein the quality criterion is selected from the group consisting of: peak signal to noise ratio (PSNR); gaps; energy; entropy; contrast; data density; data of a feature; a sudden change in measurement values; time-depth tracking; pixel size; density of a feature per depth interval; stripes on an image; a sudden change in a color; and truncation caused by a time-depth event.

20. The apparatus of claim 19, wherein the second data set is selected from the group consisting of: data from a single run; data from a specified time period within a run; a selected geographical region; a combination of two or more geographical regions; runs made over a selected time period; data sets using at least one common downhole tool; and runs made for a particular customer.

* * * * *